United States Patent [19]

Buttner et al.

[11] Patent Number: 5,167,432

[45] Date of Patent: Dec. 1, 1992

[54] SAFETY BUMPER WITH SIGNALLING DEVICE

[75] Inventors: Manfred Buttner, Dietenheim; Fritz D. Buchien, Schelklingen, both of Fed. Rep. of Germany

[73] Assignee: Mayser GmbH & Co., Fed. Rep. of Germany

[21] Appl. No.: 635,155

[22] PCT Filed: May 16, 1990

[86] PCT No.: PCT/EP90/00786
§ 371 Date: Dec. 27, 1990
§ 102(e) Date: Dec. 27, 1990

[87] PCT Pub. No.: WO90/14677
PCT Pub. Date: Nov. 29, 1990

[30] Foreign Application Priority Data

May 16, 1989 [DE] Fed. Rep. of Germany ....... 3915931

[51] Int. Cl.⁵ .................................................. B60R 19/00
[52] U.S. Cl. ............................................ 293/4; 293/120; 200/61.44
[58] Field of Search ............. 293/2, 4, 120, 121, 293/122; 180/274, 275, 277, 279; 200/85 R, 85 A, 86 R, 61.43, 61.44

[56] References Cited

U.S. PATENT DOCUMENTS

| | | |
|---|---|---|
| 3,133,167 | 5/1964 | Miller . |
| 3,493,257 | 2/1970 | Fitzgerald et al. .................. 293/120 |
| 3,599,744 | 8/1971 | Satterfield ........................... 293/4 X |
| 4,293,752 | 10/1981 | Koenig . |
| 4,596,412 | 6/1986 | Everett et al. ........................... 293/4 |

FOREIGN PATENT DOCUMENTS

| | | |
|---|---|---|
| 636827 | 12/1963 | Belgium .................................. 293/4 |
| 3009112 | 9/1981 | Fed. Rep. of Germany . |
| 3427771 | 2/1986 | Fed. Rep. of Germany . |
| 1273397 | 9/1961 | France ..................................... 293/4 |
| 836126 | 6/1960 | United Kingdom .................... 293/4 |
| 1369174 | 7/1974 | United Kingdom . |

Primary Examiner—Margaret A. Focarino
Assistant Examiner—Joseph D. Pape
Attorney, Agent, or Firm—Evenson, Wands, Edwards, Lenahan & McKeown

[57] ABSTRACT

Safety bumpers provide flexible strips for making contact inside a hollow space in a foamed body. It is suggested to carry out the making of contact by way of a closed switching strip which is mounted in a hollow space bordered by a frame preferably designed as a U-profile. An elastic pressure strip having webs extending transversely with respect to the switching strip is assigned to this switching strip. As a result, making of contact is ensured in the case of an arrangement which is not susceptible to pollution and humidity influences and which also permits a pre-assembling.

18 Claims, 2 Drawing Sheets

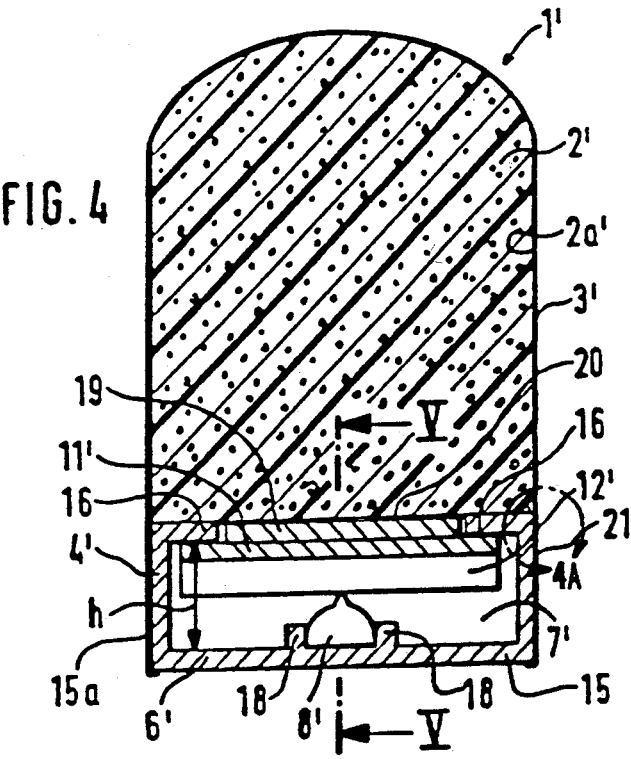
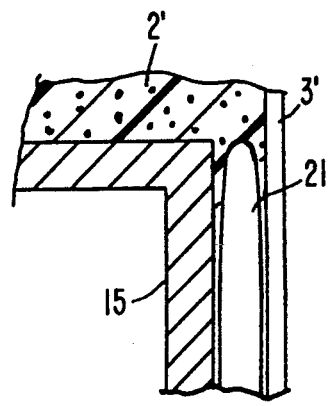
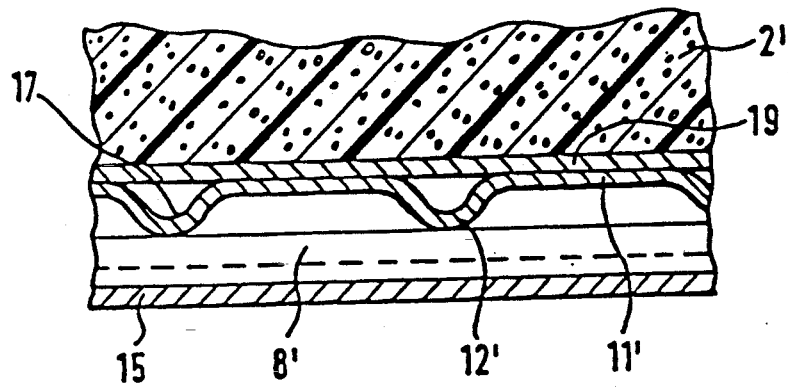

SAFETY BUMPER WITH SIGNALLING DEVICE

BACKGROUND AND SUMMARY OF THE INVENTION

The invention relates to a safety bumper having a bumper body consisting of an elastic foamed material and having a supporting plate and an electric switching device in the form of a strip-shaped contact arrangement which switches when outside pressure is exercised on the bumper body.

Safety bumpers of this type are known (Safety Bumper Brochure of MAYSER Polymer Electric, Imprint SB/5/2.89/D). Safety bumpers of this type are used, for example, for being mounted on robots or unmanned transport systems in order to cause an immediate stoppage of such devices should these come in contact with persons in an unintended manner. The advantage of such safety bumpers is the fact that such shut-off devices, because of the construction of the foamed-material bumper, have no sharp edges and also cannot be bent.

In the known constructions, the design is such that the switching device consists of two flexible strips. As a rule, one strip is fastened directly to a supporting plate arranged on the rear of the safety bumper while the other strip is arranged at the foamed bumper body at a corresponding distance to the first strip in a hollow space created for this purpose. Since, as a rule, the foamed bodies are covered toward the front with an airtight and watertight skin, it is necessary to leave the supporting plates open toward the rear so that the foamed material which is used as the elastic element for the approaching and moving away of the switching strip can be compressed in the desired manner while discharging part of its air volume and, mainly because of the returning air, can resume its initial position which had existed before a deformation. Safety bumpers of this type can therefore be used only to a limited extent at locations with high air pollution or high humidity because the relatively sensitive switching strips are affected in an undesirable manner. In addition, the fastening of one of the switching strips to the foamed body requires a relatively expensive manufacturing.

It is an object of the invention to develop a safety bumper of the initially mentioned type in such a manner that the device becomes less sensitive to outside influences and its manufacturing is facilitated.

For achieving this object, it is provided in the case of a safety bumper of the initially mentioned type that the supporting plate is equipped with a frame and in that the contact arrangement is constructed as a switching strip fastened to the supporting plate inside the hollow space formed by the frame, an elastically bendable pressure strip, which is arranged on the opposite wall of the hollow space and is provided particularly with elevations for the contacting of the switching strip, being assigned to the switching strip. By means of this design, the foamed material takes over only a shock absorber function and, at points at which it is pressed from the outside, exercises a force on the pressure strip which will elastically bend at this point. It touches the switching strip, which is completely sealed in itself, for the purpose of making contact. The elastic pressure strip restores itself automatically. In the case of the design according to the invention, the elastic pressure strip forms the elastic restoring element which, in the known arrangements was formed by the foamed material. By means of the new development, the making of contact cannot be disadvantageously affected by environmental influences (dusty or humid air) because the contact takes place inside the switching strip which is sealed off. Nevertheless, a sensitive triggering is maintained. The elastic pressure strip, in each case, provides the required switching pressure. In this case, it is advantageous that the switching strip is arranged inside a hollow space which is surrounded by firm walls and which is fixedly connected with the supporting plate carrying the switching strip. This permits an extensive pre-assembling and creates a robust construction.

According to certain preferred embodiments, it is advantageous to provide the pressure strip with elevations for the contacting of the switching strip because the local pressure forces exercised on the switching plate can be increased in this manner and the reliability of the triggering of a switching operation becomes higher. Each bending of the pressure strip therefore, if the distances of the webs are selected correspondingly, will result in some sort of point contact of the pressure strip which reliably triggers the desired switching operation.

A particularly advantageous embodiment of the invention includes an arrangement wherein the frame is provided with an inwardly directed edge extending at least on the opposite longitudinal sides and wherein the pressure strip rests against the inner edge of this edge. In this case, the frame is simultaneously also used as a holding device for the pressure strip so that the complete switching device, comprising the switching strip, the supporting plate, the frame and the pressure strip, may be premounted without the foamed body. Despite the resting of the pressure strip against the lower edge of the edge of the frame, a flush contact with the foamed body takes place according to preferred embodiments wherein the pressure strip is provided with an elevation projecting into the area between the inner edges of the edge which face one another, and wherein the elevation has a height corresponding to the thickness of the edge. In certain preferred embodiments, the bumper body can be glued directly on the edge facing away from the switching strip.

Certain preferred embodiments include an arrangement wherein the frame and the supporting plate are parts of a one-piece profiled strip having a C-shaped cross-section, and wherein the open faces of the profiled strip are closed off by inserted closing pieces. This arrangement permits a particularly simple and economical manufacturing because it is sufficient to cut the length of the profiled strip from an extruded profile which may, for example, be made of aluminum or plastic. The safety bumper, having a specific length, will then be produced in a simple manner by inserting closing caps on the face side, and the foamed body may then be glued on, in which case, this foamed body must be provided only with a smooth underside and not, as in the state of the art, with a hollow space. The new design therefore permits an economical series production which can also be automated.

Certain preferred embodiments include an arrangement wherein the bumper body is covered by an impermeable skin which is tightly connected with the surrounding frame or the lateral walls of the profiled strip, and wherein a lattice-type fabric band is provided under the skin in the area of the lateral walls of the bumper body and the outer walls of the profiled strip, the fabric band being used for the fastening of the bumper body to the profiled strip, on the one hand, and, on the other hand, for the fastening of the skin to the bumper body and to the profiled strip. These features finally offer special advantages with respect to the fastening of the foamed bumper body on the pre-assembled switching device.

The invention is illustrated in the drawing by means of embodiments and will be described in the following.

BRIEF DESCRIPTION OF THE DRAWINGS

FIG. 4 is another embodiment of a safety bumper according to the invention in which a profiled strip is used;

FIG. 4a is an expanded view of the safety bumper of FIG. 4 illustrating the interrelationship between the skin and fabric layers; and FIG. 5 is a part of a longitudinal sectional view of the safety bumper of FIG. 4.

DETAILED DESCRIPTION OF THE DRAWINGS

Figure 1:
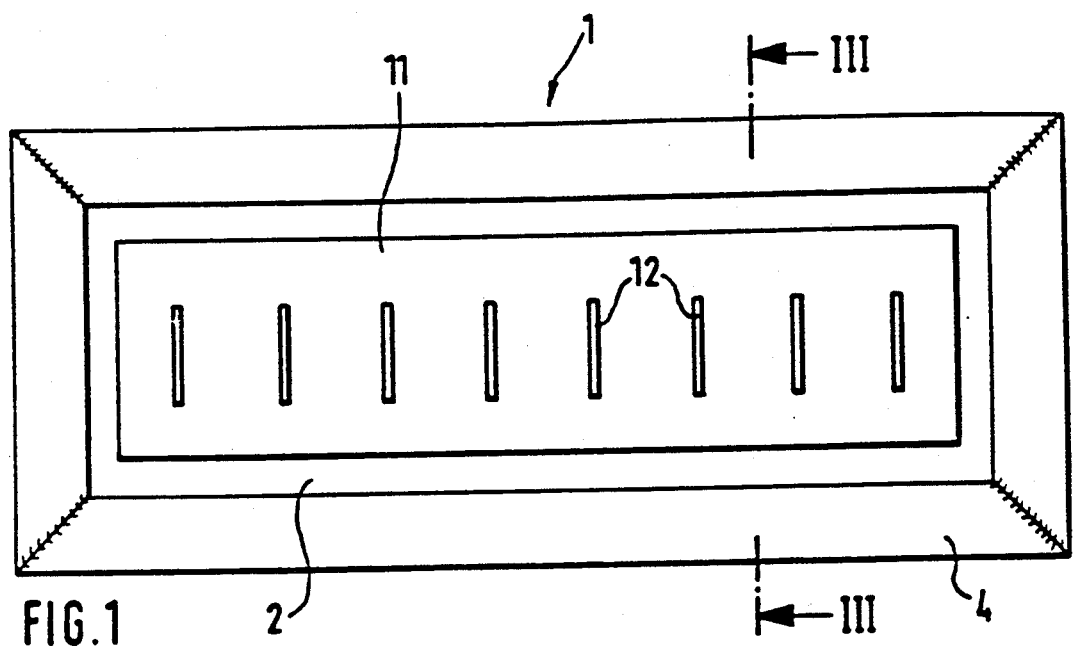
FIG. 1 is a view of a safety bumper invention in the direction I of FIG. 2 but while the supporting plate is removed.
Figure 2:
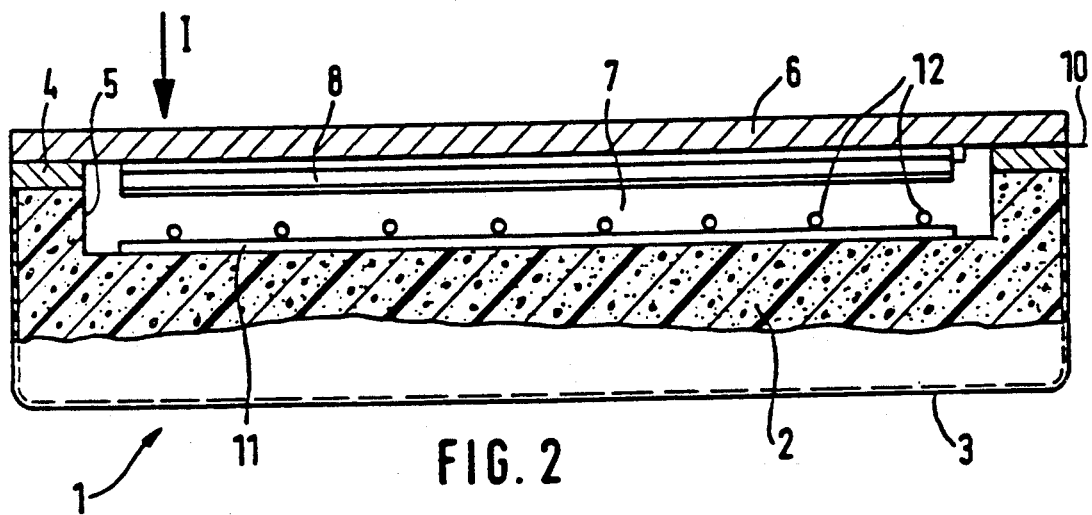
FIG. 2 is a longitudinal sectional view of the safety bumper of FIG. 1 and 3 along Line II—II in FIG. 3.
Figure 3:
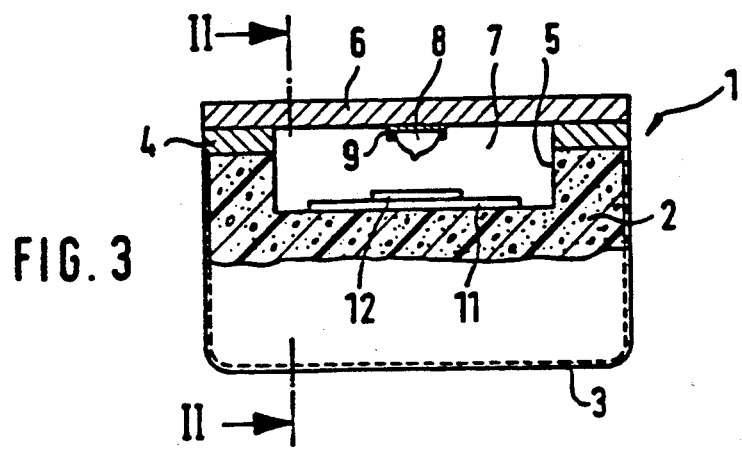
FIG. 3 is a cross-sectional view of the safety bumper of FIG. 1 and 2 along Line III—III in FIG. 1.

In FIGS. 1 to 3, a safety bumper 1 is illustrated which is provided with a bumper body 2 which consists of an elastic foamed material and which is provided on the outside with an impermeable skin 3 which is tightly connected with a surrounding metal frame 4 to which the foamed body 2 is also glued. The foamed body 2 has a rectangular recess 5 which, together with a supporting plate 6 forming the rear closure of the safety bumper 1, forms a hollow space 7 in the interior of the bumper body 2 in which, as will be described in the following, the switching device is arranged which triggers a contact when outside forces are exercised on the bumper body 2 transversely to the plane of the supporting plate 6. The openings provided in it which are not shown and which permit the pressure compensation from the hollow space 7 when the foamed body 2 is deformed, are therefore provided on the side of the safety bumper 1 by which the safety bumper 1 is mounted on the part to be secured.

The switching device comprises a switching strip 8 which is known per se and which consists of an elastic hose-type profile held in a supporting profile 9, contact strips being arranged in the hose-type profile which are sealed off toward the outside and which come in contact with one another when the elastic profile of the switching strip 8 is touched on the outside. The switching strip 8 has electric leads 10 which in the embodiment are led out, in a sealed manner, between the supporting plate 6 and the frame 4 with which the supporting plate 6 is tightly connected, for example, screwed together, welded together or made in one piece.

An elastically bendable pressure strip 11 is mounted, for example, glued to the wall of the hollow space 7 which is opposite the supporting plate 6. The pressure strip 11 may, for example, consist of an elastic plastic strip which is glued directly to the foamed material of the bumper body 2. On this pressure strip 11, elevations are provided in the form of webs 12 which—as shown in FIG. 3—extend transversely with respect to the longitudinal direction of the switching strip 8 and are arranged uniformly distributed along the length of the pressure strip 11 at a distance from one another. The length of the webs 12 is dimensioned to be such that, even if the bumper body 2 is deformed by external forces not completely perpendicularly with respect to the supporting plate 6, nevertheless a contact takes place between one of the webs 12 and the switching strip 8 when the elastic pressure strip 11 bends as a result of the external forces exercised on the bumper body 2. The distance of the pressure strip ii from the switching strip is shown at an enlarged scale in the embodiment. The arrangement may also be made in such a manner that the webs 12 of the pressure strip 11 come in slight contact with the outer shell of the switching strip 8 so that the switching sensitivity is enhanced and the switching times are as low as possible.

The punctiform contact between the switching strip 8 and one of the webs 12 leads to the triggering of the switching operation if pressure is exercised on the foamed body 2 from the outside. For example, the drive of an unmanned floor conveyor cart, to which the safety bumper 1 is fastened at the front, can then be switched off. If this type of a floor conveyor cart then unintentionally drives against a person crossing its travelling path, the drive of the cart will be switched off immediately. Naturally, the new safety bumpers may be used in all conditions in which safety bumpers have already been used previously. The relatively robust construction is advantageous which nevertheless does not result in any disadvantages with respect to the response sensitivity of the safety device.

The robust construction may still be improved considerably according to the embodiment of FIG. 4 and 5. In the embodiment of FIG. 4 and 5, the supporting plate 6' on which the switching strip 8' is mounted and the frame 4' is each part of an integrally constructed profiled strip 15 which may, for example, be made of aluminum and is extruded in a known manner and then only has to be cut into lengths. This profiled strip 15 has a C-profile and, on the upper edge of the lateral frame parts 4', has an edge 16 directed toward the inside which therefore partially covers in the upward direction the hollow space 7' in which the switching strip 8' is arranged. The pressure strip 11' rests on both sides on the interior side of this edge 16 facing the hollow space 7' and, in the embodiment, as indicated particularly in FIG. 5, is constructed as a continuous web profile provided with curved-out areas 17, these curved-out areas 17 forming the webs 12' which rest against the switching strip 8'. As a result of this construction, the pressure strip 11' is elastically pressed against the edge 16. The dimensions of the pressure strip and the webs 12', the height of the switching strip 8' and the clearance height (h) of the profiled strip 15, in this case, can be coordinated in a simple manner in such a way that the desired contact is caused of the pressure strip 11' on the edge 16, on the one hand, and by means of the webs 12' on the switching strip 8' on the other hand.

As shown in FIG. 4, the profiled strip 15 is provided with two ribs 18 in its center which extend in parallel to one another and form a groove between one another for receiving the switching strip 8'.

In order to ensure a snug contact of the pressure strip 11' on the bumper body 2', an elevation of the pressure strip 11' is provided in the area between the free ends of the edges 16 facing one another which, in the embodiment, has the shape of a flat strip 19 which is glued together with the pressure strip 11'. Naturally, it would also be possible to produce the pressure strip 11' in one piece with the elevation strip 19 if this seems more expedient. As a result of the selected embodiment, the pressure strip 11' rests directly on the underside 20 of the bumper body 2' which, by means of this underside 20, in its lateral outer areas, is glued on the top side of the edges 16 which faces it. The bumper body 2', which is a foamed body, in a very simple manner, can be provided with the lower straight end side 20. The connection with the profiled strip 15 also does not present any problems.

In the embodiment, the bumper body 2' is also provided with a skin 3' sealing it off toward the outside. This skin reaches into the area of the lateral walls 15a of the profiled strip 15. In this area, it is connected with the lateral wall 15a by way of a lattice-type fabric band 21 provided between the profiled strip and the lateral wall 15a, this fabric band 2i also extending into a part of the lateral walls of the bumper body 2' and also being connected with them, particularly being glued to them. This is illustrated in detail in FIG. 4a. For this purpose, the two parallel lateral walls 2a' of the bumper body 2' of the safety bumper 1' illustrated in FIGS. 4 and 5 are in alignment with the outer walls 15a of the profiled strip 15. The arrangement of the fabric band 21 ensures an intimate connection between the bumper body 2' and the profiled strip 15, on the one hand, and the skin 3' and the whole safety bumper 1', on the other hand. This type of lateral fastening therefore aids the glued connection of the bumper body 2' on the top side of the edges 16.

As easily recognizable in FIGS. 4 and 5, the shown embodiment permits a complete pre-assembling of the switching device comprising the profiled strip 15, the switching strip 8' and the pressure strip 11'. The face-side closure takes place in a simple manner by end face stoppers which are adapted to the profile of the profiled strip 15 and which, in the area of the ribs 18 and of the switching strip 8' guided in it, may have a corresponding recess. The stoppers fit on the end shown in FIG. 4. These stoppers may also easily be equipped with outlet openings for the electric lines The whole, already pre-assembled switching device may then, in a simple manner, be glued together with the bumper body 2' as described.

We claim: claims:

1. A safety bumper having a bumper body consisting of an elastic foamed material and having a supporting plate and an electrical switching device in the form of a strip-shaped contact arrangement which switches when outside pressure is exercised on the bumper body, wherein the supporting plate is provided with a frame and wherein the contact arrangement is constructed as a switching strip fastened to the supporting plate inside a hollow space formed by the frame, an elastically bendable pressure strip being disposed on a first wall of the hollow space and the switching strip being attached to an opposing wall vertically displaced from the first wall, the pressure strip resting against the switching strip.

2. A safety bumper according to claim 1, wherein the pressure strip is provided with elevation as for the contacting of the switching strip and in that the elevations are constructed as webs arranged to be distributed at uniform distances with respect to one another in the longitudinal direction of the pressure strip, the webs extending transversely with respect to the longitudinal direction of the switching strip.

3. A safety bumper according to claim 1, wherein the pressure strip rests on the side of the switching strip facing toward the inwardly directed edge.

4. A safety bumper according to claim 1, wherein the pressure strip is provided with an elevation projecting into the area between vertical inner edges of the inwardly directed edge which face one another.

5. A safety bumper according to claim 4, wherein the elevation has a height corresponding to a vertical thickness of the edge.

6. A safety bumper according to claim 1, wherein the bumper body is placed on a side of the edge facing away from the switching strip.

7. A safety bumper according to claim 1, wherein the frame and the supporting plate are parts of a one-piece profiled strip having a C-shaped cross-section.

8. A safety bumper according to claim 7, wherein open faces of the profiled strip are closed off by inserted closing pieces.

9. A safety bumper according to claim 1, wherein the bumper body is covered by an impermeable skin which is tightly connected with the lateral wall f the profiled strip.

10. A safety bumper according to claim 9, wherein a lattice-type fabric ban is provided under the skin in the area of the lateral walls of the bumper body and the lateral walls of the profiled strip, the fabric band being used for the fastening of the bumper body to the profiled strip and for the fastening of the skin to the bumper body and to the profiled strip.

11. A safety bumper according to claim 2, wherein the frame is provided with an inwardly directed edge extending at least on the opposite wall and wherein the pressure strip rests against a horizontally disposed inner edge of the inwardly directed edge.

12. A safety bumper according to claim 11, wherein the pressure strip rests on the side of the switching strip facing toward the inwardly directed edge.

13. A safety bumper according to claim 3, wherein the pressure strip is provided with an elevation projecting into an area between vertical inner edges of the inwardly directed edges which face one another.

14. A safety bumper according to claim 13, wherein the elevation has a height corresponding to a vertical thickness of the edge.

15. A safety bumper according to claim 1, wherein the bumper body is covered by an impermeable skin which is tightly connected with the lateral walls of the profiled strip.

16. A safety bumper according to claim 7, wherein the bumper body is covered by an impermeable skin which is tightly connected with the surrounding frame or the lateral walls of the profiled strip.

17. A safety bumper according to claim 15, wherein a lattice-type fabric band is provided under the skin in the area of the lateral walls of the bumper body and the lateral walls of the profiled strip, the fabric band being used for the fastening of the bumper body to the profiled strip and for the fastening of the skin to the bumper body and to the profiled strip.

18. A safety bumper according to claim 16, wherein a lattice-type fabric band is provided under the skin in the area of the lateral walls of the bumper body and the lateral walls of the profiled strip, the fabric band being used for the fastening of the bumper body to the profiled strip and for the fastening of the skin to the bumper body and to the profiled strip.

* * * * *